(12) United States Patent
Bach et al.

(10) Patent No.: US 9,302,710 B2
(45) Date of Patent: Apr. 5, 2016

(54) FRONT PILLAR ATTACHMENT FOR A VEHICLE BODY

(71) Applicant: Honda Motor Co., Ltd., Tokyo (JP)

(72) Inventors: Edward Bach, Galloway, OH (US); Kurtis Ray Horner, Marysville, OH (US); Adam J. Rompage, Dublin, OH (US); Masahiro Ishikawa, Dublin, OH (US); Anthony Ordonio, Jr., Dublin, OH (US); Aron K. Madsen, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/813,391

(22) Filed: Jul. 30, 2015

(65) Prior Publication Data

US 2016/0039471 A1    Feb. 11, 2016

Related U.S. Application Data

(60) Provisional application No. 62/034,411, filed on Aug. 7, 2014.

(51) Int. Cl.
*B62D 25/04* (2006.01)
*B62D 29/00* (2006.01)
*B60J 1/00* (2006.01)

(52) U.S. Cl.
CPC ............. *B62D 25/04* (2013.01); *B60J 1/006* (2013.01); *B60J 1/007* (2013.01); *B62D 29/008* (2013.01)

(58) Field of Classification Search
CPC ..... B62D 25/04; B62D 129/008; B60J 1/006; B60J 1/007

USPC ..................................................... 296/193.06
See application file for complete search history.

(56) References Cited

U.S. PATENT DOCUMENTS

| | | |
|---|---|---|
| 5,163,730 A | 11/1992 | Welch |
| 5,575,500 A | 11/1996 | Mimura et al. |
| 5,630,622 A | 5/1997 | Kirschenmann et al. |
| 5,772,277 A | 6/1998 | Fukuda |
| 5,810,428 A | 9/1998 | Maki |
| 5,988,733 A | 11/1999 | Kamo et al. |

(Continued)

FOREIGN PATENT DOCUMENTS

| | | |
|---|---|---|
| JP | 4147797 | 9/2008 |
| JP | 4244558 | 3/2009 |

(Continued)

*Primary Examiner* — Joseph D Pape
(74) *Attorney, Agent, or Firm* — Rankin, Hill & Clark LLP

(57) ABSTRACT

A vehicle body assembly includes a front pillar including a unitary, one-piece tubular structural member having a first end portion and an opposite second end portion. The structural member defines a vehicle exterior-side wall section and a passenger compartment-side wall section. A first structural node is fastened to the passenger compartment-side wall section at the first end portion of the structural member. A second structural node is fastened to the passenger compartment-side wall section at the second end portion of the structural member. The structural member is formed of a first metal and each of the first and second structural nodes are formed of a second metal different than the first metal. An electrically nonconductive adhesive is interposed between the structural member first end portion and the first structural node and is interposed between the structural member second end portion and the second structural node.

20 Claims, 5 Drawing Sheets

(56) References Cited

U.S. PATENT DOCUMENTS

| | | |
|---|---|---|
| 6,854,786 B2 | 2/2005 | Berglund et al. |
| 6,983,982 B2 | 1/2006 | Saeki |
| 7,344,186 B1 | 3/2008 | Hausler et al. |
| 7,434,870 B2 | 10/2008 | Kinoshita et al. |
| 7,585,017 B2 | 9/2009 | Zimmerman et al. |
| 7,735,907 B2 | 6/2010 | Moore et al. |
| 7,810,871 B2 | 10/2010 | Matsui |
| 7,845,713 B2 | 12/2010 | Terai et al. |
| 8,439,432 B2 * | 5/2013 | Nusier .................. B62D 25/06 296/193.06 |
| 8,444,211 B2 | 5/2013 | Fujita |
| 8,454,083 B2 | 6/2013 | Dimitriou et al. |
| 8,474,904 B2 | 7/2013 | Suga |
| 8,523,275 B2 | 9/2013 | Jorgensen et al. |
| 8,662,568 B2 | 3/2014 | Weigl et al. |
| 2010/0237661 A1* | 9/2010 | Baccouche ............ B62D 25/06 296/210 |
| 2013/0193716 A1 | 8/2013 | Kurokawa |
| 2013/0241238 A1 | 9/2013 | Fujita |
| 2014/0084631 A1 | 3/2014 | Kojima |

FOREIGN PATENT DOCUMENTS

| | | |
|---|---|---|
| JP | 5001229 | 1/2010 |
| JP | 5045505 | 10/2012 |

\* cited by examiner

FRONT PILLAR ATTACHMENT FOR A VEHICLE BODY

The present application claims priority to U.S. Prov. Patent App. Ser. No. 62/034,411, filed Aug. 7, 2014, the entirety of which is incorporated herein.

BACKGROUND

Front pillars (i.e., A-pillars) on a vehicle are structural members of a body frame positioned between the windshield and the front doors. The front pillars support the roof structure as well and, therefore, must provide substantial support in rollover events. At the same time, the front pillars lie within sight lines of the vehicle operator and need to have a minimal profile to allow the operator to maintain proper vision with respect to the front pillars. Thus, there can be conflicting requirements with respect to the design of the front pillars. To provide a strong structural member for the body frame, each front pillar needs to have a maximum cross-sectional configuration, yet maintain a minimal cross-section for vision purposes. Commonly, each front pillar is formed as a structural member having a closed cross-section by welding together an outer panel and an inner panel in an overlapping manner. Each of the outer panel and the inner panel typically includes a weld flange for joining the other. The weld flanges also provide for a sealing relationship with respect to both the windshield and the front door that are supported on the front pillars. However, because the weld flanges project outwardly from each front pillar, the traditional flange formation can be restrictive and can result in a correspondingly narrower field of view for the operator from within the passenger compartment.

BRIEF DESCRIPTION

In accordance with one aspect, a vehicle body assembly comprises a front pillar extending at an incline rearwards and upwards to form a part of a door opening. The front pillar includes a unitary, one-piece tubular structural member having a first end portion and an opposite second end portion. The structural member defines a vehicle exterior-side wall section and a passenger compartment-side wall section. A first structural node is fastened to the passenger compartment-side wall section at the first end portion of the structural member. A second structural node is fastened to the passenger compartment-side wall section at the second end portion of the structural member. The structural member is formed of a first metal and each of the first and second structural nodes are formed of a second metal different than the first metal. An electrically nonconductive adhesive is interposed between the structural member first end portion and the first structural node and is interposed between the structural member second end portion and the second structural node.

In accordance with another aspect, a front pillar structure for a vehicle body comprises a unitary, one-piece tubular structural member formed of a first metal. The structural member has an outer upper wall section, an outer lateral side wall section, an inner lower wall section and an inner lateral side wall section. A first structural node formed of a second metal is configured to be fastened to both the inner lower wall section and inner lateral side wall section at a first end portion of the structural member. A second structural node formed of the second metal is configured to be fastened to both the inner lower wall section and inner lateral side wall section at a second end portion of the structural member. The first metal is a steel or steel based alloy and the second metal is aluminum or aluminum based alloy.

In accordance with yet another aspect, a vehicle body assembly comprises a front pillar including a unitary, one-piece tubular structural member having a first end portion and an opposite second end portion. The structural member defines a vehicle exterior-side wall section and a passenger compartment-side wall section. The structural member is formed of a steel or steel-based alloy. A first structural node is fastened to the passenger compartment-side wall section at the first end portion of the structural member. The first end portion includes a first trim portion overlying a section of the first structural node. A second structural node is fastened to the passenger compartment-side wall section at the second end portion of the structural member. The second end portion includes a second trim portion overlying a section of the second structural node. Each of the first structural node and second structural node is formed of an aluminum or aluminum-based alloy. An electrically nonconductive adhesive is interposed between the structural member first end portion and the first structural node and is interposed between the structural member second end portion and the second structural node. A windshield is mounted to the front pillar. A first portion of the windshield is adhered directly to the vehicle exterior-side wall section of the structural member, and a gap between the vehicle exterior-side wall section and the windshield first portion is substantially constant.

DETAILED DESCRIPTION

It should, of course, be understood that the description and drawings herein are merely illustrative and that various modifications and changes can be made in the structures disclosed without departing from the present disclosure. In general, the figures of the exemplary vehicle body are not to scale. As used herein, lateral directions are transverse across the vehicle, i.e., left and right directions. Likewise, longitudinal directions refer to forward and rearward directions of vehicle travel, and the vertical directions relate to elevation, i.e., upward and downward directions. It will also be appreciated that the various identified components of the exemplary vehicle body and front pillar disclosed herein are merely terms of art that may vary from one manufacturer to another and should not be deemed to limit the present disclosure.

Figure 1:
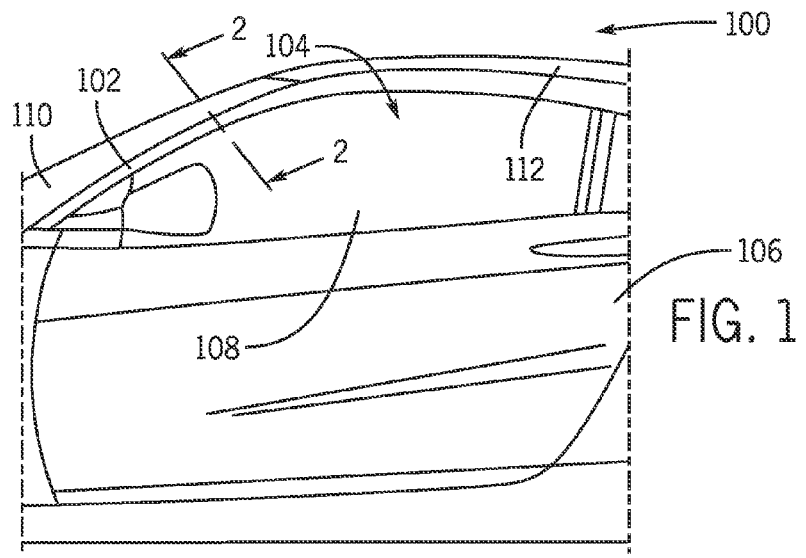
FIG. 1 is a schematic view of a front left section of a vehicle body.

Referring now to the drawings, wherein like numerals refer to like parts throughout the several views, FIG. 1 depicts a side section of a vehicle body frame 100 The vehicle body frame 100 includes left and right front pillars or A-pillars (only left front pillar 102 is visible), each front pillar extending at an incline rearwards and upwards to form a part of door opening (only left door opening 104 is visible) that is opened or closed by a front door (only left front door 106 and left front door glass 108 are depicted). A windshield 110 is mounted between the left and right front pillars, and a roof structure 112 is at least partially supported by the front pillars. Structural components of a known left front pillar 120 are reflected in FIG. 2, which is a cross-sectional view of the left front pillar 102 corresponding to line 2-2 of FIG. 1. Because the left and right known front pillars are bilaterally symmetrical to each other, a description will be given hereafter for the known left front pillar 120 only and a description for the known right front pillar will be omitted. The left front pillar 120 will hereafter be referred to simply as the known front pillar.

Figure 2:
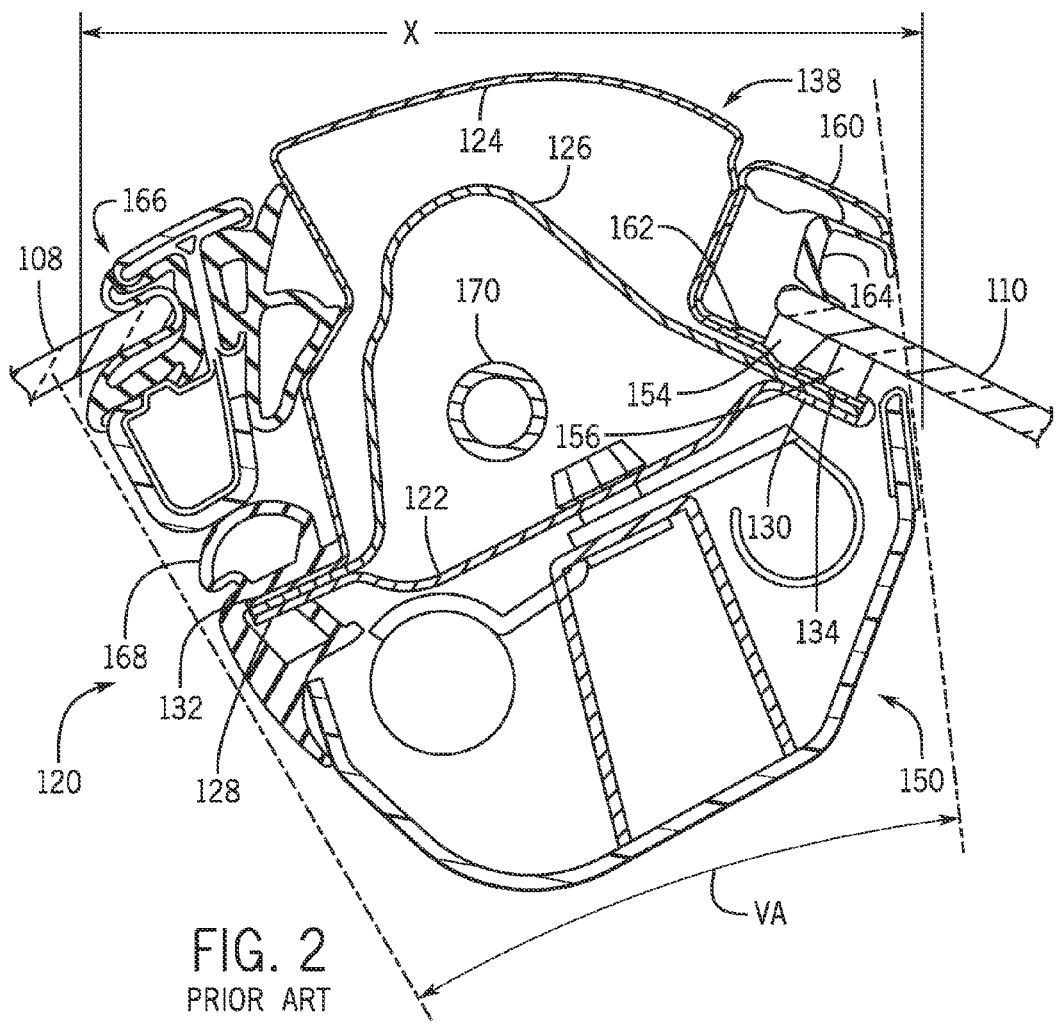
FIG. 2 is a cross-sectional view of a known front pillar taken along line 2-2 of FIG. 1.

The known front pillar 120 is typically formed of an inner panel member 122 and an outer panel member 124. A reinforcement member 126 is interposed between the inner and outer members 122, 124. The inner member 122 is formed with opposing weld flanges 128, 130. The outer member 124 has mating weld flanges 132, 134 which are welded to the flanges 128, 130 of the inner member 122 to form a generally hollow, vertically extending structural beam 138. A pillar inner cover 150 is disposed inwardly of the known front pillar 120 in the vehicle passenger compartment or cabin and is fastened to the inner member 122. The pillar inner cover 150 covers the known front pillar 120 from the inside of the vehicle cabin. The windshield 110 is adhered to the outer member 124 via an adhesive 154 and a spacer 156 is located inward of the adhesive 154 to properly set a predetermined gap between the windshield 110 and front pillar 120. A garnish 160 covers a space between the windshield 110 and the outer member 124. As depicted, the garnish 160 can be C-shaped and includes a lower portion 162 located beneath the windshield 110. A seal 164 provided at an open end of the garnish and sealingly engages the windshield 110. As is further well known, a weatherseal 166 is provided between the front door 106 and the outer member 124. A separate seal 168 is connected to the mating flanges 128, 132 and sealingly engages the weatherseal 166. A sunroof drain tube 170 can extend through the structural beam 138. An overall width "X" of the known front pillar 120 is depicted in FIG. 2. This width is typically a distance that is dependent on the windshield construction and the joining of the weld flanges 128, 130 of the inner member 122 and the weld flanges 132, 134 of the outer member 124. By way of example, a standard overall width of the known front pillar is about 124 mm. The overall width also defines a visibility angle VA of the known front pillar 120 relative to the position of the operator of the vehicle.

Figure 3:
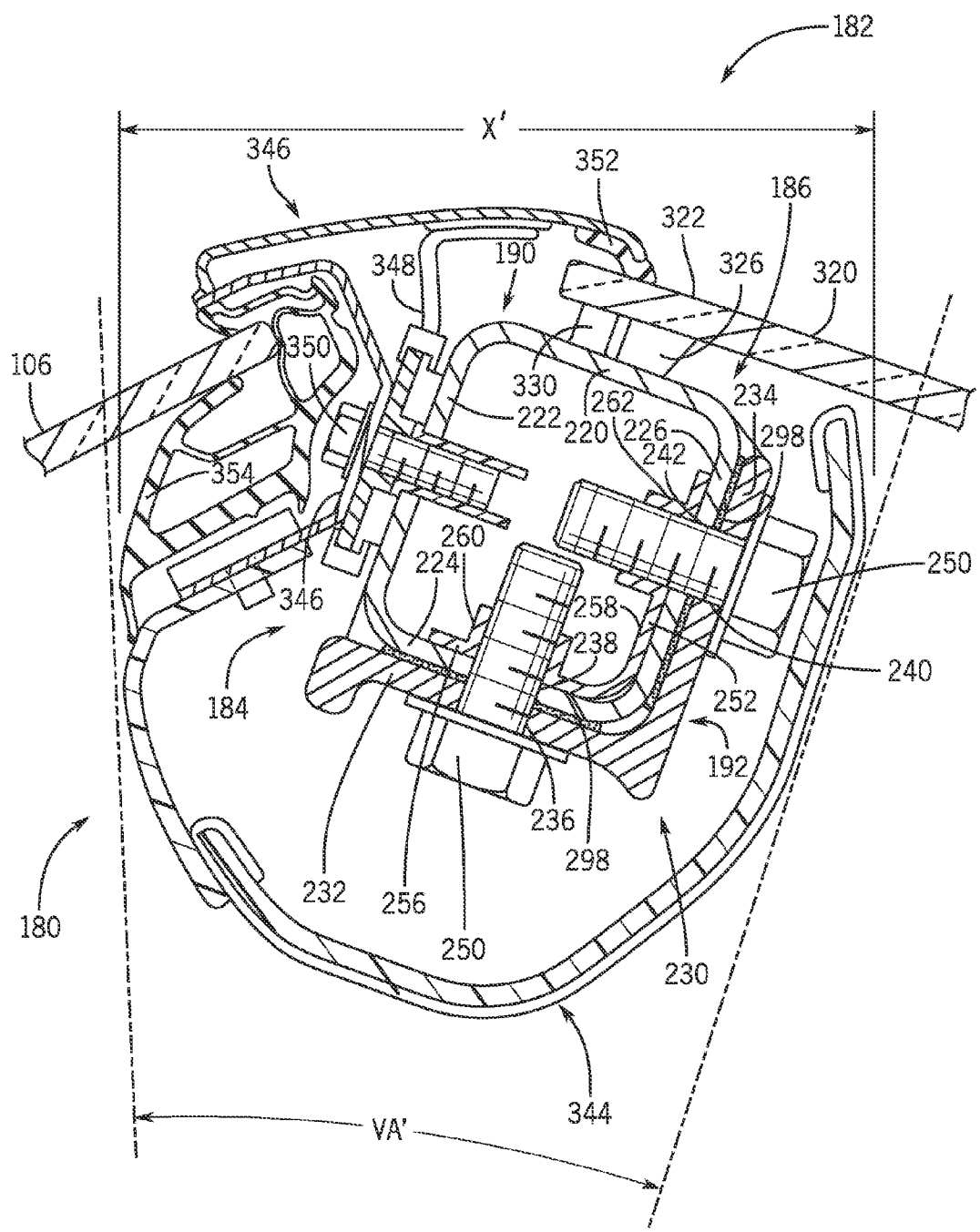
FIG. 3 is a cross-sectional view of an exemplary front pillar according to the present disclosure along line 3-3 of FIG. 9.
Figure 4:
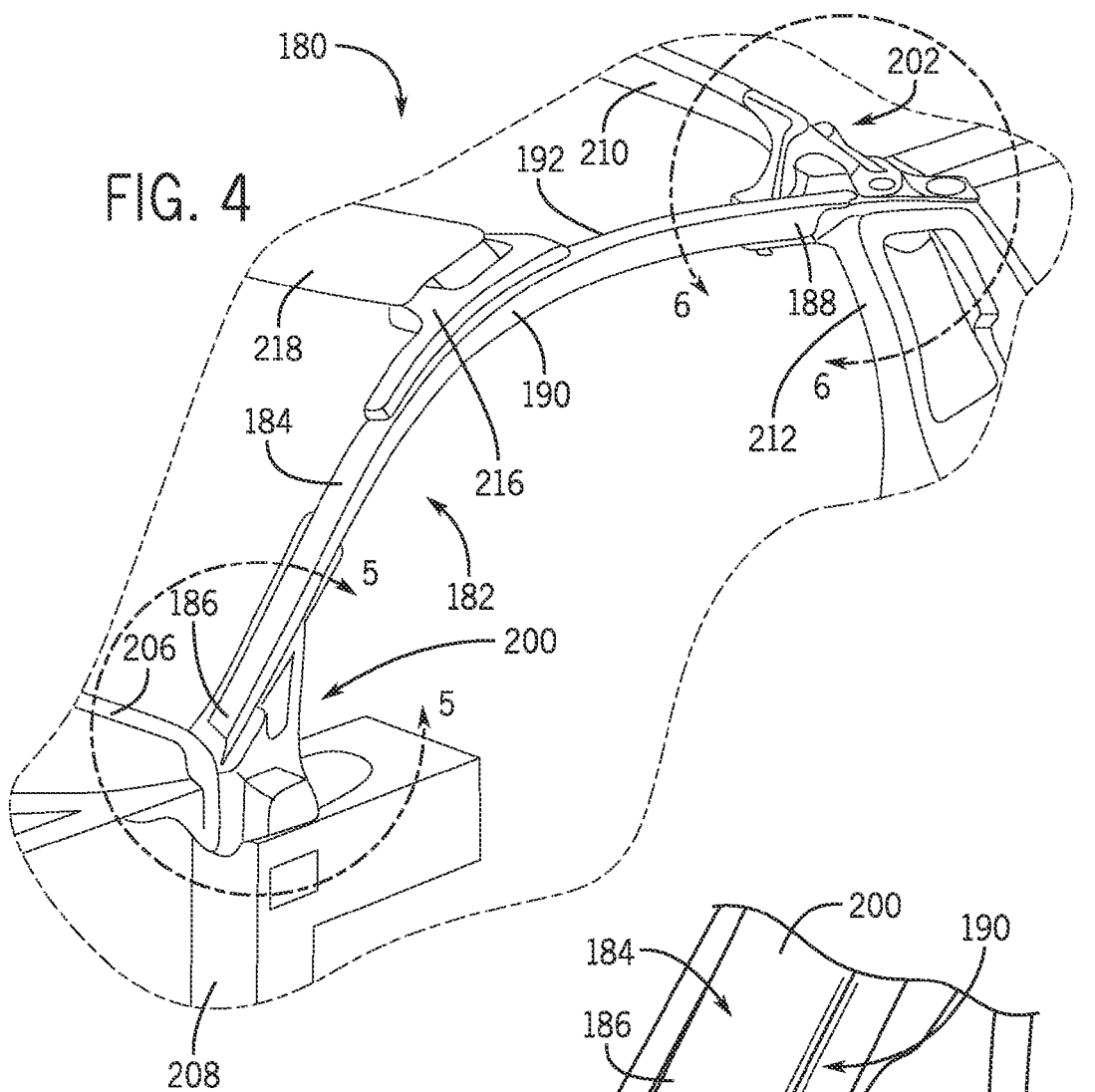
FIG. 4 is a schematic view of an exemplary vehicle body including the front pillar of FIG. 3.

With reference now to FIGS. 3 and 4, a vehicle body assembly 180 according to the present disclosure comprises left and right front pillars or A-pillars (only left front pillar 182 is visible), each front pillar extending at an incline rearwards and upwards to form a part of a door opening (only left door opening is visible). Again, because the left and right exemplary front pillars are bilaterally symmetrical to each other, a description will be given hereafter for the exemplary left front pillar 182 only and a description for the exemplary right front pillar will be omitted. The exemplary left front pillar 182 will hereafter be referred to simply as the front pillar. The front pillar 182 includes a tubular (i.e., hollow) structural member 184 having a first end portion 186 and an opposite second end portion 188. The structural member 184 can be a single (i.e., unitary, one-piece) integrated component having a closed cross-section and defines a vehicle exterior-side wall section 190, a passenger compartment-side wall section 192 and a passenger compartment bottom wall section 194. The vehicle body assembly 180 further comprises a first left structural node 200 and a second left structural node 202. Similarly configured first and second structural nodes are provided on a right side of the vehicle body assembly 180. The first structural node 200 is configured to be fastened to the passenger compartment-side wall section 192 and the passenger compartment bottom wall section 194 at the first end portion 186 of the structural member 184. The second structural node 202 is configured to be fastened to the passenger compartment-side wall section 192 and the passenger compartment bottom wall section 194 at the second end portion 188 of the structural member 184. With this arrangement of the first and second structural nodes 200, 202, an area of the front pillar 182 extending between the first and second end portions 186, 188 of the structural member 184 is devoid of a second separate structural member. This allows for a reduction in a width "X'" of the exemplary front pillar 182, which, in turn, increases a visibility angle "VA" of the front pillar 182.

During the fabrication of the vehicle body assembly 180, it is necessary to connect portions of the vehicle body to each other. Also, due to cosmetic, assembly, and vehicle operational considerations (for example, the structures of the parts to be connected, the locations of these parts on the vehicle, and the stresses under which the connections will operate during vehicle use), it may not be feasible to form a direct connection between the structural body parts along the exterior surfaces of the body parts. As used herein, the term "structural node" is defined as a separate element of the vehicle body at which and by which two or more vehicle body portions are connected.

As further depicted in FIG. 4, the vehicle body assembly 180 includes a cowl 206 and a lower left structural member 208, each of which is connected to the first structural node 200. An end portion of a roof bow 210 and an upper portion of a left B-pillar 212 are connected to the second structural node 202. A roof extension member 216 is secured to the structural member 184 for attachment to an end portion of a front roof rail 218. It should be appreciated from FIG. 4 that the structural member 184 of the front pillar 182 defines a forward part of a roof side rail for supporting a roof structure (not shown) over the passenger compartment.

With reference to FIG. 3, the structural member 184 is formed by four sides, namely four wall sections 220, 222, 224, 226, so as to have a substantially rectangular closed cross-section. It should be appreciated though that substantially rectangular refers to a rectangle, a square, or another quadrilateral. By way of example, according to the depicted embodiment the structural member 184 can be made of a rectangular pipe. The four wall sections 220 through 226 are an outer upper wall section 220, an outer lateral side wall section 222 located on an outside in a vehicle width direction, an inner lower wall section 224, and an inner lateral side wall section 226 located on an inside in the vehicle width direction. The outer upper wall section 220 and the outer lateral side wall section 222 form the vehicle exterior-side wall section 190 that is substantially L-shaped in cross-section, and the inner lower wall section 224 and the inner lateral side wall section 226 form the passenger compartment-side wall section 192 that is also substantially L-shaped in cross-section. Therefore, the vehicle exterior-side wall section 190 is positioned on the structural member 184 towards an exterior of the vehicle body assembly 180. The passenger compartment-side wall section 192 is positioned on the structural member 184 towards an interior of the vehicle body assembly 180 (i.e., towards the passenger compartment).

Figure 5:
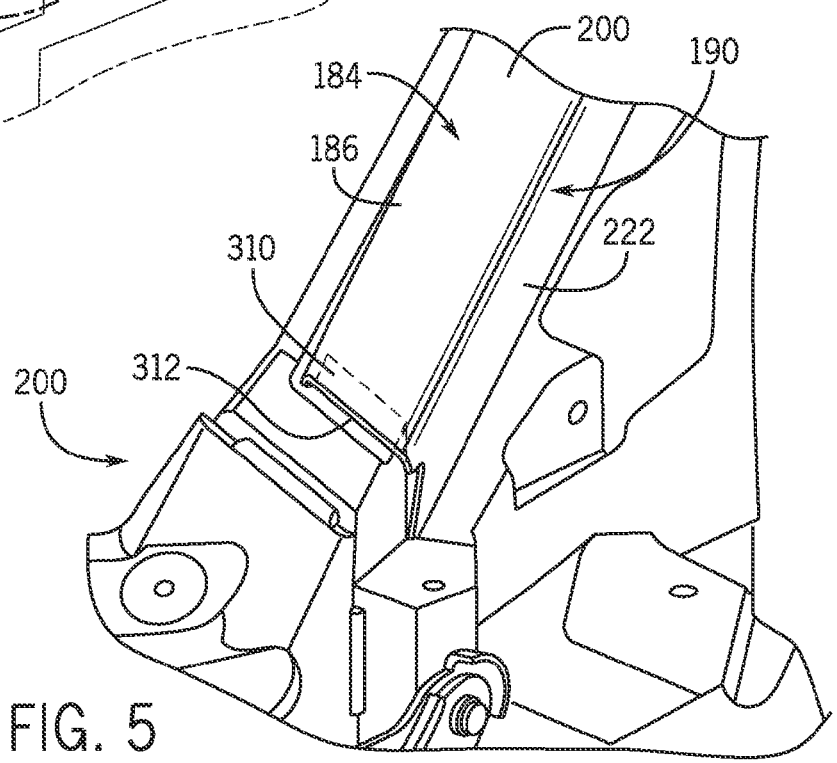
FIGS. 5 and 6 are enlarged views of selected portions of the vehicle body of FIG. 4.

According to one aspect, each of the first and second structural nodes 200, 202 are configured to be fastened to both the inner lower wall section 224 and inner lateral side wall section 226 of the passenger compartment-side wall section 192. Particularly, FIGS. 3 and 5 depict the first end portion 186 of the structural member 184 of the front pillar 182 secured to the first structural node 200. As shown, the first structural node 200 can include a substantially L-shaped section 230 having a first part 232 for attachment to the inner lower wall section 224 and a second part 234 for attachment to the inner lateral side wall section 226. The first part 232 includes at least one mounting aperture 236 provided coaxially with a through-hole 238 located on the inner lower wall section 224, and the second part 234 includes at least one mounting aperture 240 provided coaxially with a through-hole 242 located on the inner lateral side wall section 226. In the depicted embodiment, bolts 250 extend through the mounting apertures 236, 240 and the through-holes 238, 242 and threadingly engage a first reinforcement 252. The first reinforcement 252 can be configured to conform to an inner surface of the passenger compartment-side wall section 192 of the structural member 184 such that the first reinforcement 252 is secured to both the first end portion 186 of the structural member 184 and the first structural node 200. The first reinforcement 252, which can be at least partially housed within the structural member 184, is substantially L-shaped and includes a first section 256 and a second section 258. Each of the first and second sections 256, 258 is provided with a respective threaded section 260, 262 (e.g., a welded nut) that is aligned coaxially with the respective through-holes 238, 242. The threaded sections 260, 262 are capable of having the bolts 250 screwed thereinto. It should be appreciated that in lieu of the first reinforcement 252, the through-holes 238, 242 of the respective inner lower wall section 224 and inner lateral side wall section 226 can be threaded allowing the bolts 250 to be screwed directly to the first end portion 186 of the structural member 184.

Figure 6:
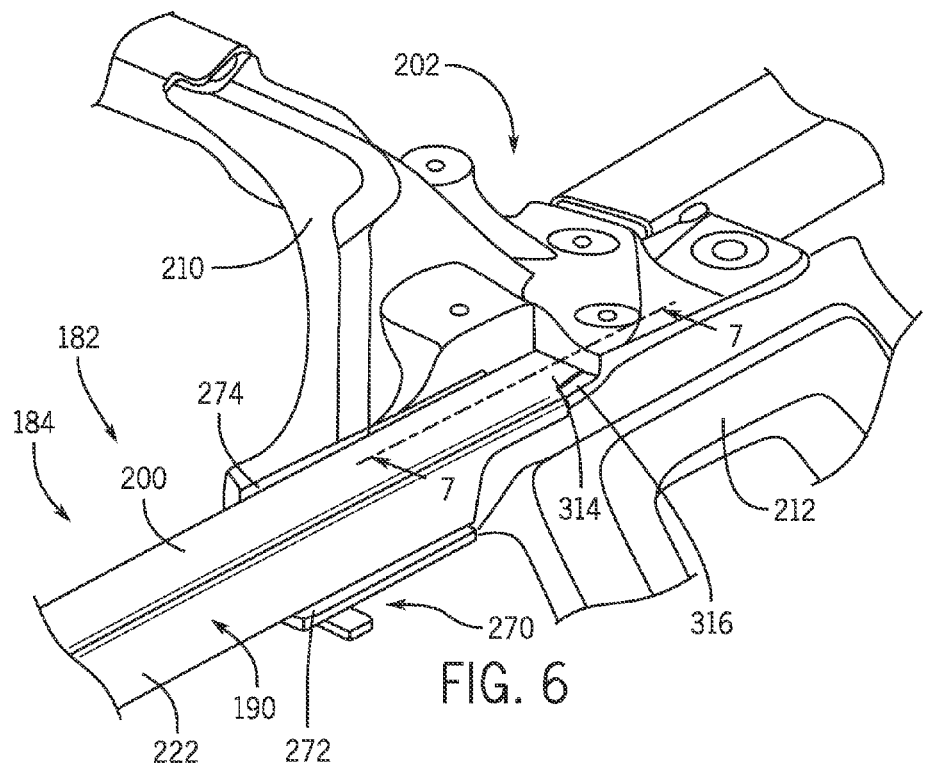
Figure 7:
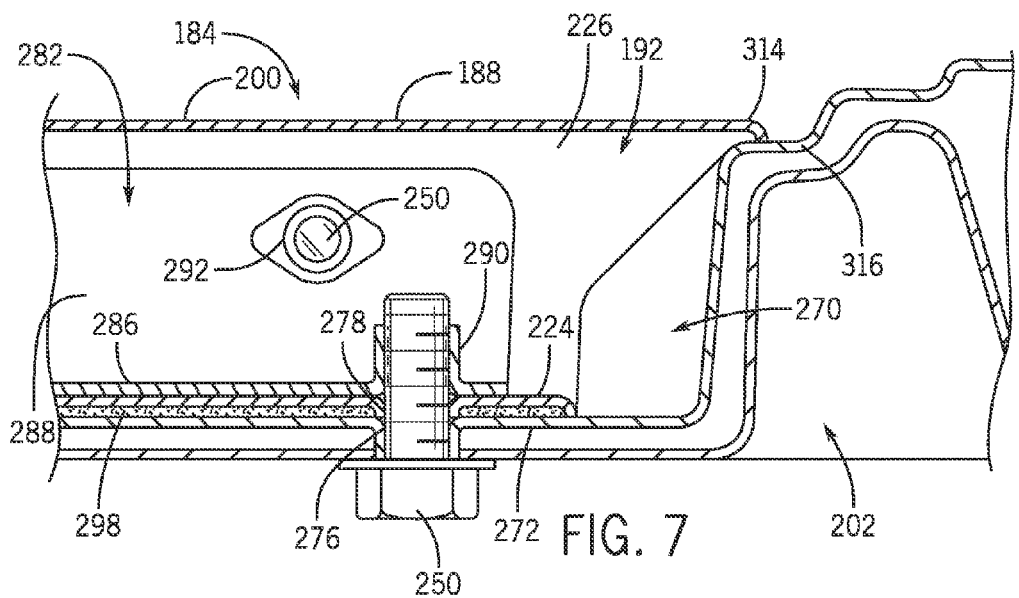
FIG. 7 is a cross-sectional view taken along line 7-7 of FIG. 6.

FIGS. 6 and 7 depict the second end portion 188 of the structural member 184 of the front pillar 182 secured to the second structural node 202. As shown, the second structural node 202 can include a substantially L-shaped section 270 having a first part 272 for attachment to the inner lower wall section 224 and a second part 274 for attachment to the inner lateral side wall section 226. The first part 272 includes at least one mounting aperture 276 provided coaxially with a through-hole 278 located on the inner lower wall section 224, and the second part 234 includes at least one mounting aperture (not visible) provided coaxially with a through-hole (not visible) located on the inner lateral side wall section 226. In the depicted embodiment, the bolts 250 extend through the mounting apertures and the through-holes and threadingly engage a second reinforcement 282. Similar to the first reinforcement 252, the second reinforcement 282 can be configured to conform to an inner surface of the passenger compartment-side wall section 192 of the structural member 184 such that the second reinforcement 282 is secured to both the second end portion 188 of the structural member 184 and the second structural node 202. The second reinforcement 282, which can be at least partially housed within the structural member 184, is substantially L-shaped and includes a first section 286 and a second section 288. Each of the first and second sections 286, 288 is provided with a respective threaded section 290, 292 (e.g., a welded nut) that is aligned coaxially with the respective through-holes of the respective inner lower wall section 224 and inner lateral side wall section 226. The threaded sections 290, 292 are capable of having the bolts 250 screwed thereinto. Again, it should be appreciated that the in lieu of the second reinforcement 282, the through-holes of the respective inner lower wall section 224 and inner lateral side wall section 226 can be threaded allowing the bolts 250 to be screwed directly to the second end portion 188 of the structural member 184.

According to one aspect of the present disclosure, the structural member 184 is formed of a first metal and each of the first and second structural nodes 200, 202 are formed of a second metal different than the first metal. By way of example, the first metal can be a steel or steel based alloy. The second metal can be aluminum or aluminum based alloy, allowing the first and second nodes 200, 202 to be cast in a single piece and finish machined where necessary. However, the first and second nodes 200, 202 may be formed using any suitable process or processes. To prevent galvanic corrosion between the differing first and second metals, an electrically nonconductive adhesive 298 is interposed between the first end portion 186 of the structural member 184 and the first structural node 200 (FIG. 3) and is interposed between the second end portion 188 of the structural member 184 and the second structural node 202 (FIG. 7).

With reference back to FIG. 5, the first end portion 186 of the front pillar structural member 184 includes a trim portion 310 overlying a section 312 of the first structural node 200. The trim portion 310 defines a water seal between the vehicle exterior-side wall section 190 at the first end portion 186 and the first structural node 200. Similarly, with reference to FIGS. 6 and 7, the second end portion 188 of the front pillar structural member 184 includes a trim portion 314 overlying a section 316 of the second structural node 202. The trim portion 314 defines a water seal between the vehicle exterior-side wall section 190 at the second end portion 188 and the second structural node 202.

Figure 8:
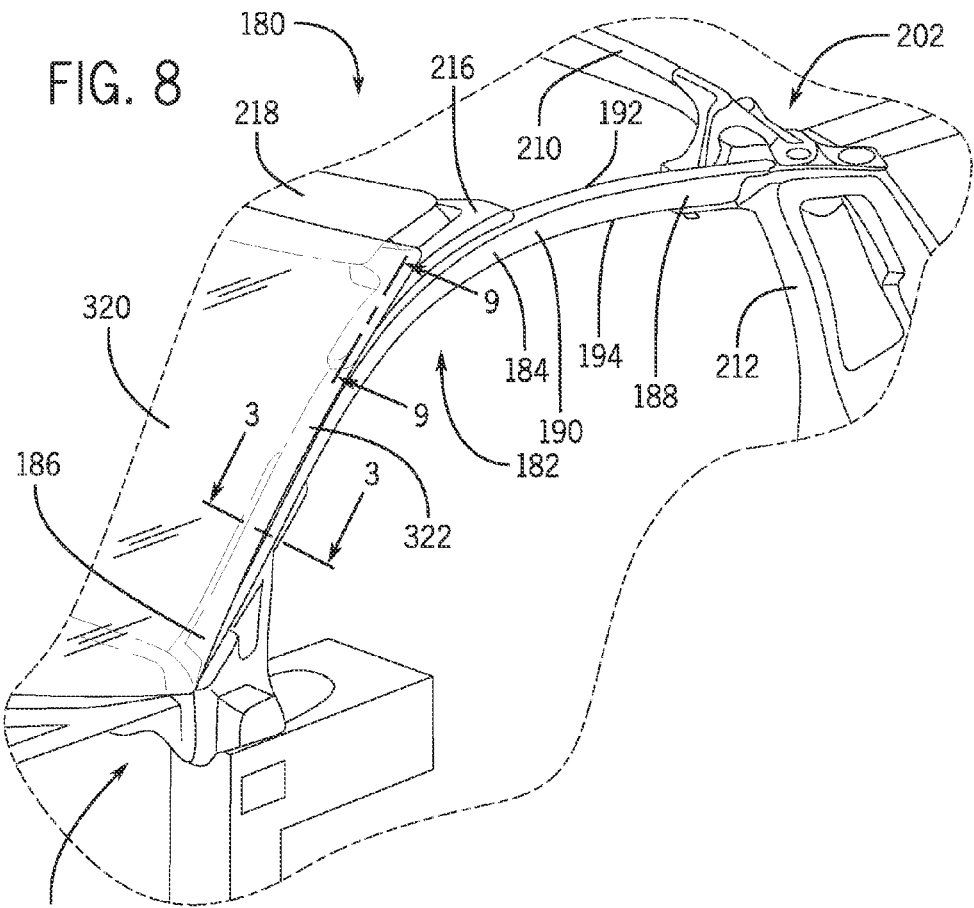
FIG. 8 is a schematic view of the exemplary vehicle body of FIG. 4 including a windshield.
Figure 9:
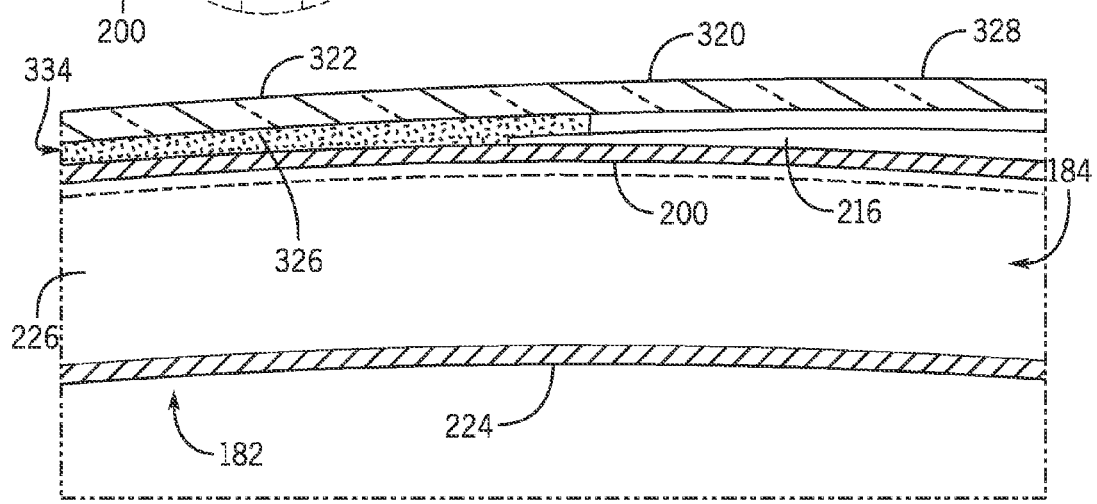
FIG. 9 is a cross-sectional view taken along line 9-9 of FIG. 8.

As shown in FIGS. 3, 8 and 9, the vehicle body assembly 180 further includes a windshield 320 (similar to windshield 110) mounted to the front pillar 184. A first edge portion 322 of the windshield 320 is adhered directly to the vehicle exterior-side wall section 190 of the structural member via an adhesive 326. Particularly, according to one aspect, the windshield includes a spacer 330 extending inward to the outer upper wall section 220. The spacer 330 is sized to engage an underside of the first edge portion 322 of the windshield 320. The adhesive 326 is located laterally outward of the spacer 330. With the use of the spacer 330, a gap 334 between the structural member 184 and the first edge portion 322 of the windshield 320 is substantially constant. Further, as indicated previously, the roof extension member 216 is secured to the structural member 184 and has fixed thereto the front roof rail 218. A second edge portion 338 of the windshield 310 rearward of the first edge portion 322 is adhered to the roof extension member 216. This allows the structural member 184 of the front pillar 182 to follow a curvature of the front door 106 instead of a curvature of the windshield 320.

With continued reference to FIG. 3, the front pillar 182 includes a pillar inner cover 344 disposed inwardly of the front pillar 182 in the vehicle passenger compartment or cabin and a pillar outer cover 346 disposed outwardly of the front pillar 182. The pillar inner cover 344 can be formed of, for instance, a synthetic resin and covers the front pillar 182 from the inside of the vehicle cabin. Similarly, the pillar outer cover 346 can be formed of, for instance, a synthetic resin and covers the front pillar 182 located between the front door 106 and the windshield 320 from the outside. According to one aspect, the pillar inner cover 344 is secured to the outer lateral side wall section 222 of the structural member 184 via a first attachment member 346. The pillar outer cover 346 is also secured to the outer lateral side wall section 222 via a second attachment member 348. As shown, a bolt 350 fastens each of the first attachment member 346 and the second attachment member 348 to the outer lateral side wall section 222. A seal 352 is also provided between the pillar outer cover 346 and the windshield 320. A weatherseal 354 is provided between the front door 106 and the pillar inner and outer covers 344, 346. A sunroof drain tube, harness and airbag (all not shown) can extend through the front pillar 182 and can be secured to one of the structural member 184, first structural node 200 and second structural node 202.

The width "X" of the exemplary front pillar 182 is depicted in FIG. 3. In contrast to the width of the known front pillar 120, which is typically a distance that is dependent on the joining of the weld flanges of the inner and outer members 122, 124, the width of the front pillar 182 is defined by a width of the pillar inner cover 346 which can be reduced by use of the exemplary structural member 184. By way of example, the width of the exemplary front pillar 182 is between 85 mm and 90 mm. As indicated previously, the width of the pillar inner cover 346 also defines the visibility angle "VA"' of the front pillar 182 relative to the position of the operator of the vehicle, and the visibility angle is also increased with use of the exemplary front pillar 182. Further, with the windshield 320 being adhered to the structural member 184 and the roof extension member 216, the visual field through the windshield 320 is increased.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle body assembly comprising:
   a front pillar extending at an incline rearwards and upwards to form a part of a door opening, the front pillar including a unitary, one-piece tubular structural member having a first end portion and an opposite second end portion, the structural member defining a vehicle exterior-side wall section and a passenger compartment-side wall section;
   a first structural node fastened to the passenger compartment-side wall section at the first end portion of the structural member;
   a second structural node fastened to the passenger compartment-side wall section at the second end portion of the structural member;
   wherein the structural member is formed of a first metal and each of the first and second structural nodes are formed of a second metal different than the first metal, and further including an electrically nonconductive adhesive interposed between the structural member first end portion and the first structural node and interposed between the structural member second end portion and the second structural node.

2. The vehicle body assembly of claim 1, wherein the vehicle exterior-side wall section is defined by an outer upper wall section and an outer lateral side wall section located on an outside in a vehicle body width direction, and the passenger compartment-side wall section is defined by an inner lower wall section and an inner lateral side wall section located on an inside in the vehicle body width direction, wherein each of the first and second structural nodes are configured to be fastened to both the inner lower wall section and inner lateral side wall section of the passenger compartment-side wall section.

3. The vehicle body assembly of claim 1, further including a first reinforcement secured to both the structural member first end portion and the first structural node.

4. The vehicle body assembly of claim 3, wherein the first reinforcement is at least partially housed within the structural member first end portion.

5. The vehicle body assembly of claim 3, further including a second reinforcement secured to both the structural member second end portion and the second structural node.

6. The vehicle body assembly of claim 5, wherein the second reinforcement is at least partially housed within the structural member second end portion.

7. The vehicle body assembly of claim 5, wherein each of the first reinforcement and second reinforcement is configured to conform to an inner surface of the passenger compartment-side wall section of the structural member.

8. The vehicle body assembly of claim 5, wherein an area of the front pillar extending between the first and second end portions of the structural member is devoid of a second separate structural member.

9. The vehicle body assembly of claim 1, further including a windshield mounted to the front pillar, a first edge portion of the windshield being adhered directly to the vehicle exterior-side wall section of the structural member.

10. The vehicle body assembly of claim 9, wherein a gap between the structural member and the first edge portion of the windshield is substantially constant.

11. The vehicle body assembly of claim 1, wherein the first metal is a steel or steel based alloy and the second metal is different than the first metal.

12. A front pillar structure for a vehicle body comprising:
    a unitary, one-piece tubular structural member formed of a first metal, the structural member having an outer upper wall section, an outer lateral side wall section, an inner lower wall section and an inner lateral side wall section;
    a first structural node formed of a second metal, the first structural node being configured to be fastened to both the inner lower wall section and inner lateral side wall section at a first end portion of the structural member; and
    a second structural node formed of the second metal, the second structural node being configured to be fastened to both the inner lower wall section and inner lateral side wall section at a second end portion of the structural member, wherein the first metal is a steel or steel based alloy and the second metal is aluminum or aluminum based alloy.

13. The front pillar structure of claim 12, further including:
    a first reinforcement secured to both the structural member first end portion and the first structural node, and
    a second reinforcement secured to both the structural member second end portion and the second structural node.

14. The front pillar structure of claim 13, wherein the first reinforcement is at least partially housed within the structural member first end portion and the second reinforcement is at least partially housed within the structural member second end portion.

15. The front pillar structure of claim 12, further including an electrically nonconductive adhesive interposed between the structural member first end portion and the first structural node and interposed between the structural member second end portion and the second structural node.

16. The front pillar structure of claim 12, wherein the structural member first end portion includes a first trim portion overlying a section of the first structural node and the structural member second end portion includes a second trim portion overlying a section of the second structural node.

17. The front pillar structure of claim 16, wherein each of the first trim portion and second trim portion defines a water seal.

18. The front pillar structure of claim 12, further including a pillar inner cover and a pillar outer cover, each of the pillar inner cover and pillar outer cover being secured to the outer lateral side wall section of the structural member.

19. The front pillar structure of claim 18, wherein the pillar inner cover defines a width and visibility lines of the front pillar, the width being between 85 mm and 90 mm.

20. A vehicle body assembly comprising:
  a front pillar including a unitary, one-piece tubular structural member having a first end portion and an opposite second end portion, the structural member defining a vehicle exterior-side wall section and a passenger compartment-side wall section, the structural member being formed of a steel or steel-based alloy;
  a first structural node fastened to the passenger compartment-side wall section at the first end portion of the structural member, the first end portion including a first trim portion overlying a section of the first structural node;
  a second structural node fastened to the passenger compartment-side wall section at the second end portion of the structural member, the second end portion including a second trim portion overlying a section of the second structural node, each of the first structural node and second structural node being formed of aluminum or aluminum-based alloy;
  an electrically nonconductive adhesive interposed between the structural member first end portion and the first structural node and interposed between the structural member second end portion and the second structural node;
  a windshield mounted to the front pillar, a first portion of the windshield being adhered directly to the vehicle exterior-side wall section of the structural member, a gap between the vehicle exterior-side wall section and the windshield first portion being substantially constant.

* * * * *